United States Patent [19]

Fukui et al.

[11] Patent Number: 5,087,114
[45] Date of Patent: Feb. 11, 1992

[54] LIQUID CRYSTAL DEVICE WHEREIN THE MOST OPTIMUM RATIO OF SPACING BETWEEN SUBSTRATES IN WHICH THE LIQUID CRYSTAL IS DISPOSED AND BEFORE DISPOSING OF THE LIQUID CRYSTAL IS 0.77–0.87

[75] Inventors: Takeshi Fukui; Toshio Watanabe, both of Atsugi, Japan

[73] Assignee: Semiconductor Energy Laboratory Co., Ltd., Atsuti, Japan

[21] Appl. No.: 448,315

[22] Filed: Dec. 11, 1989

[30] Foreign Application Priority Data

Dec. 12, 1988 [JP] Japan .................. 63-313222

[51] Int. Cl.⁵ .................................... G02F 1/13
[52] U.S. Cl. ............................................ 359/81
[58] Field of Search ........................................ 350/344

[56] References Cited

U.S. PATENT DOCUMENTS

| | | | |
|---|---|---|---|
| 4,362,771 | 12/1982 | Umeda et al. | 350/344 X |
| 4,390,245 | 6/1983 | Shimizu et al. | 350/344 |
| 4,626,073 | 12/1986 | Amtutz et al. | 350/344 |
| 4,740,060 | 4/1988 | Komura et al. | 350/344 |

FOREIGN PATENT DOCUMENTS

| | | | |
|---|---|---|---|
| 0036843 | 3/1980 | Japan | 350/344 |
| 0029031 | 2/1982 | Japan | 350/344 |
| 0008128 | 1/1987 | Japan | 350/344 |
| 0006527 | 1/1988 | Japan | 350/344 |
| 0113729 | 5/1989 | Japan | 350/344 |
| 2143050 | 1/1985 | United Kingdom | 350/344 |

*Primary Examiner*—Stanley D. Miller
*Assistant Examiner*—Huy K. Mai
*Attorney, Agent, or Firm*—Sixbey, Friedman, Leedom & Ferguson

[57] ABSTRACT

An improved liquid crystal device is described. The distance between a pair of substrates is kept constant by means of spacers interposed therebetween. The material, the size and the distribution density of the spacers are chosen in order that the distance between the mated substrates just before the liquid crystal is disposed in the formation of the liquid crystal device is 0.77–0.87 of that after the disposing.

5 Claims, 3 Drawing Sheets

FIG.3

| | | |
|---|---|---|
| X<br>A | X<br>B | X<br>C |
| X<br>D | X<br>E | X<br>F |
| X<br>G | X<br>H | X<br>I |
| X<br>J | X<br>K | X<br>L |

LIQUID CRYSTAL DEVICE WHEREIN THE MOST OPTIMUM RATIO OF SPACING BETWEEN SUBSTRATES IN WHICH THE LIQUID CRYSTAL IS DISPOSED AND BEFORE DISPOSING OF THE LIQUID CRYSTAL IS 0.77-0.87

BACKGROUND OF THE INVENTION

The present invention relates to a liquid crystal device and manufacturing method for the same.

In recent years, ferroelectric liquid crystal materials have attracted the interest of researchers due to their quasi-hysteresis characteristics. The performance of this type liquid crystal device depends largely on the distance between a pair of substrates in which liquid crystal material is disposed. If there is substantial disparity in distance between the substrates, the response times of respective constituent cell elements are dispersed, and degradation of display performance and irregular color result.

The disparity is produced mainly during the filing process of liquid crystal material in the narrow space between the substrates. Vacuum filling method is a known method for filling the space between a pair of substrates of a liquid crystal device with a liquid crystal to manufacture a liquid crystal device. In this prior art method, the liquid crystal device is entered in a vacuum chamber at a vacuum together with the liquid crystal material followed by evacuation of the chamber to a vacuum condition, and then, after the inlet port of the device is caused to sink in the liquid crystal, the pressure is elevated to an atmospheric pressure so that the liquid crystal enters the liquid crystal device through the inlet port. One type of this method is described in Japanese application No. sho 60-175192.

However, there are several shortcomings associated with this method. The inlet port of the liquid crystal device is substantially narrow so that the pressure in the liquid crystal device can not be lowered rapidly. Because of this, the liquid crystal device is subjected to the differential pressure between the inside and the outside of the liquid crystal device and deformed due to the pressure when the vacuum chamber is evacuated, and therefore the thickness of the liquid crystal layer necessarily becomes nonuniform.

To comply with the shortcoming, it is proposed to mate a pair of substrates firmly to bear the differential pressure and maintain the distance between substrates by making use of hard spacers disposed therein. However, since the filling of liquid crystal material is carried out at an elevated temperature, there are formed void spaces or fissure-like branching defects when the temperature is descended to room temperature.

SUMMARY OF THE INVENTION

It is an object of the present invention to provide a liquid crystal device in which a liquid crystal layer is formed with a constant thickness.

It is another object of the present invention to provide a method of manufacturing liquid crystal devices without causing the occurrence of branching defects in a liquid crystal layer formed between the pair of substrates.

The above and other objects and advantages are accomplished by designing appropriate configuration of the spacers distribution. Through a number of experiments, an essential factor which contributes to uniformity of the distance between the substrates has been found. The factor is the ratio of the distance between the substrate before the filing of liquid crystal material to the distance after the filing. In case of ferroelectric liquid crystals, the ratio has to be chosen to be from 0.77 to 0.87 in order to obtain minimum disparity in thickness of the liquid crystal layer between the substrate.

BRIEF DESCRIPTION OF THE DRAWINGS

FIG. 3 is a diagram showing the points of a liquid crystal device at which distances were measured in order to evaluate the disparity of the substrate gap of the liquid crystal device in accordance with the present invention.

DETAILED DESCRIPTION OF THE PREFERRED EMBODIMENTS

Figure 1:
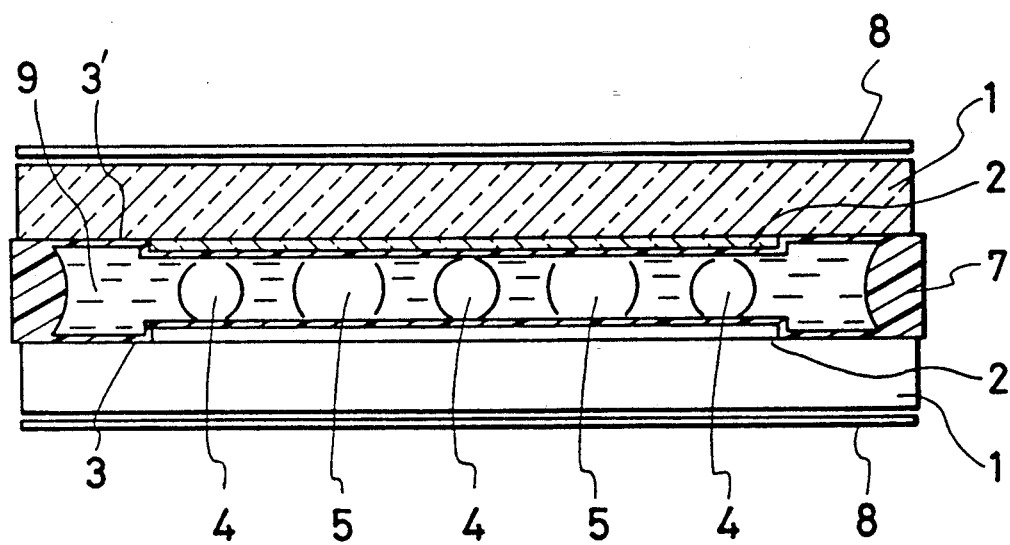
FIG. 1 is a cross sectional view showing a liquid crystal device in accordance with the present invention.

Referring now to FIG. 1, a liquid crystal display is illustrated in accordance with the present invention. In the figure, the display comprises a pair of 310 mm×220 mm glass substrates 1, transparent electrode arrangements 2 formed on the opposed insides of the substrates 1 by a known sputtering, a 500 Å orientation control film 3 made of polyimide given rubbing treatment and covering one of the inside surfaces of the substrates over the electrode arrangement a 800 Å thick $SiO_2$ film on the other inside surface, two or more kinds of spacers 5 and 4 interposed between the substrates 1, a sealing member 7 for preventing the loss of liquid crystal material and a liquid crystal layer 9 made of a ferroelectric liquid crystal material disposed between the substrates 1. For operation, crossed Nicols 8 are placed on the both external sides of the displays. The electrode arrangements are provided with two sets of parallel electrode strips in an orthogonal relationship by a known photolithography. Adjacent strips are spaced by distances of 20 micrometers for example.

The spacers are spherical particles made of epoxy resins, polystyrene and/or $SiO_2$ and distributed between the substrates 1 by the following procedure. The particles are mixed with a freon ($CFCl_2$) at 2 gram/liter and sufficiently dispersed by applying ultrasonic vibration. The freon dispersion is sprayed on the surface of a glass substrate. On the other hand, an opposed glass substrate is provided at the periphery thereof with a sealing member of a thermosetting resin such as an epoxy adhesive by screen press printing. The two substrates are joined and heated and 180° C. for two hours under a pressure of 2 $Kg/cm^2$ in order to fix the spacers and the sealing member 7. Then, an amount of ferroelectric liquid crystal material (e.g., ZLI-3775 manufactured by Merck Co.) is interposed between the substrated by vacuum charging method.

Figure 2:
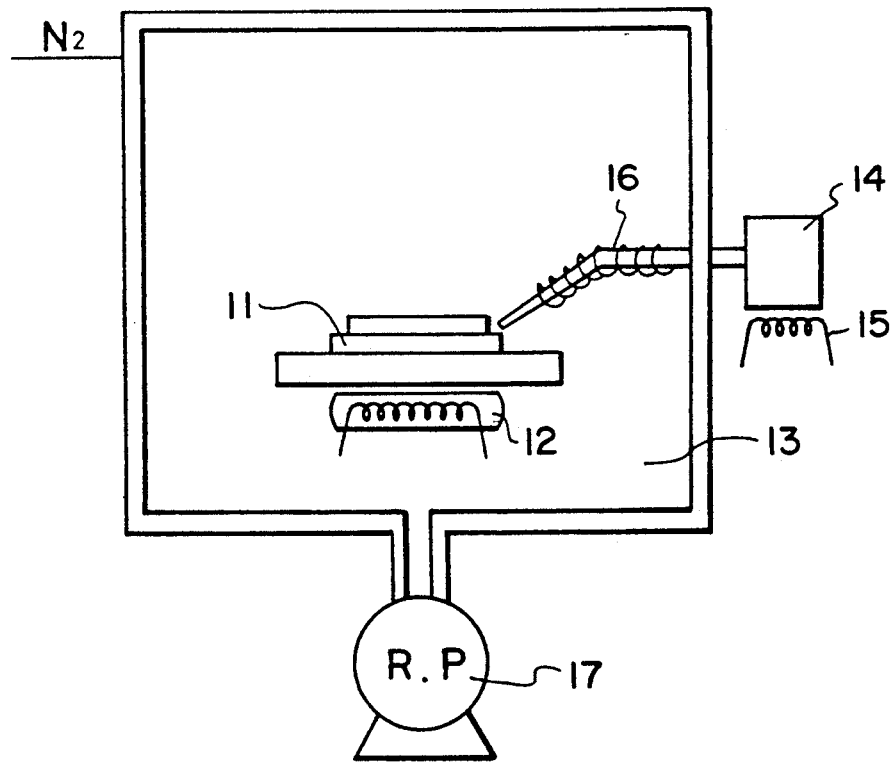
FIG. 2 is a schematic diagram showing an apparatus for disposing a liquid crystal material between a pair of substrates of a liquid crystal device.

Referring to FIG. 2, a method of filling a liquid crystal device with a ferroelectric liquid crystal is described. The liquid crystal is selected such that it is in a smectic phase at room temperature.

In the figure, a liquid crystal device 11 is placed in a vacuum chamber 13 followed by evacuation by a vacuum pump 12 in order to maintain the pressure in the chamber at $1 \times 10^{-4}$ Torr or higher whereas the liquid crystal device 11 is heated by a heater 12. On the other hand, a liquid crystal accumulated in a dispenser 14 is heated by a heater 15 above the transition temperature so that the liquid crystal is maintained in the Iso phase. An amount of the liquid crystal is poured to the inlet port of the liquid crystal device. In this process, the temperature of the liquid crystal is always maintained higher than the transition temperature of any constituent liquid crystal by the heaters 12, 15 and 16.

Then, nitrogen gas is introduced at 20SCCM to the inside of the vacuum chamber 13 to produce a differential pressure between the vacuum chamber and the inside space of the liquid crystal device to be filled with the liquid crystal material whereupon the liquid crystal in Iso phase is caused to fill the space in the device by virtue of the differential pressure. The pressure in the chamber is eventually elevated to an atmospheric pressure.

By virtue of the tow or more kinds of spacers, the distance between the substrates is maintained constant. The spacers may include fusable and non-fusable spacers. The fusable spacers 5 prohibit the expansion of the distance while the non-fusable spacers 4 prohibit the contraction of the distance. In this description, "non-fusable" is also means "non-contracting."

Following examples show data of the average distances measured in micrometers at several points as shown in FIG. 3 for liquid crystal devices prepared in accordance with the above description. Also, the chromatic is in accordance with the CIE chromaticity coordinate, 1976. In the CIE chromaticity coordinate system, colors such as red, green and the like can be indicated by x-y coordinates. For example, a certain color is indicated as (a, b) while another color would be indicated as (a', b'). The chromatic difference of the colors is described as the distance between the coordinate points (a, b) and (a', b'). Where the distance is small, the two colors are relatively similar to each other, and where the distance is large, the difference in color is apparent. In general, when the chromatic difference is less than 5, the difference cannot be recognized by the human eye. In the present invention the chromatic difference was measured utilizing a luminance meter, with the difference shown in the "Z" rows in the examples and tables which follow. 20 samples were prepared in the same preparation condition.

EXAMPLE 1

Polystyrene particles were used as non-fusable spacers. The diameter of the non-fusable particles was 2 micrometers. Epoxy particles were used as fusable spacers. Tables 1 and 2 show the average distances between the substrates of each 20 samples before and after the disposing of the liquid crystal material respectively. The top row of each table shows the diameters of the epoxy particles. The bottom row (Z row) shows the chromatic differences. A–K on the leftest column indicate the measuring points shown in FIG. 3.

TABLE 1

| | (before the disposing) | | | | | | |
|---|---|---|---|---|---|---|---|
| | 2.3 | 2.9 | 4.6 | 5.5 | 6.7 | 8.2 | 9.2 |
| A | 1.6 | 1.7 | 1.6 | 1.6 | 1.6 | 1.6 | 1.6 |
| B | 1.7 | 1.6 | 1.6 | 1.7 | 1.6 | 1.7 | 1.7 |
| C | 1.6 | 1.6 | 1.6 | 1.6 | 1.6 | 1.7 | 1.7 |
| D | 1.6 | 1.6 | 1.7 | 1.7 | 1.6 | 1.7 | 1.6 |
| E | 1.7 | 1.6 | 1.6 | 1.7 | 1.7 | 1.6 | 1.6 |
| F | 1.6 | 1.6 | 1.6 | 1.7 | 1.6 | 1.7 | 1.6 |
| G | 1.7 | 1.6 | 1.6 | 1.6 | 1.6 | 1.6 | 1.7 |
| H | 1.6 | 1.7 | 1.6 | 1.7 | 1.6 | 1.6 | 1.6 |
| I | 1.6 | 1.6 | 1.6 | 1.6 | 1.6 | 1.6 | 1.7 |
| J | 1.6 | 1.6 | 1.6 | 1.6 | 1.6 | 1.6 | 1.6 |
| K | 1.7 | 1.7 | 1.6 | 1.7 | 1.6 | 1.6 | 1.6 |

TABLE 1-continued

| | (before the disposing) | | | | | | |
|---|---|---|---|---|---|---|---|
| | 2.3 | 2.9 | 4.6 | 5.5 | 6.7 | 8.2 | 9.2 |
| L | 1.7 | 1.6 | 1.6 | 1.6 | 1.7 | 1.7 | 1.6 |

TABLE 2

| | (after the disposing) | | | | | | |
|---|---|---|---|---|---|---|---|
| | 2.3 | 2.9 | 4.6 | 5.5 | 6.7 | 8.2 | 9.2 |
| A | 1.9 | 2.1 | 2.1 | 2.1 | 2.0 | 2.1 | 2.3 |
| B | 1.8 | 2.0 | 2.0 | 2.0 | 2.0 | 2.1 | 2.4 |
| C | 1.9 | 2.1 | 2.0 | 2.0 | 2.0 | 2.1 | 2.2 |
| D | 2.0 | 2.0 | 2.1 | 2.0 | 2.0 | 2.0 | 2.2 |
| E | 1.8 | 2.1 | 2.0 | 2.0 | 2.0 | 2.1 | 2.2 |
| F | 1.9 | 2.0 | 2.0 | 2.0 | 2.1 | 2.1 | 2.2 |
| G | 1.9 | 2.0 | 2.0 | 2.0 | 2.0 | 2.1 | 2.3 |
| H | 2.0 | 2.0 | 2.0 | 2.0 | 2.0 | 2.1 | 2.3 |
| I | 2.0 | 2.1 | 2.1 | 2.0 | 2.0 | 2.0 | 2.2 |
| J | 2.0 | 2.1 | 2.0 | 2.0 | 2.0 | 2.0 | 2.3 |
| K | 1.9 | 2.0 | 2.1 | 2.0 | 2.0 | 2.1 | 2.5 |
| L | 1.9 | 2.1 | 2.0 | 2.0 | 2.0 | 2.1 | 2.4 |
| Z | 3.2 | 3.5 | 3.6 | 4.2 | 4.2 | 4.8 | 5.8 |

As can be seen from the two comparison tables, when epoxy particles of from 2.9 micrometers to 8.2 micrometers were used, the chromatic differences did not exceed 5 and therefore no color shade was appreciable to the naked eyes. Actually, out of ten persons, while four saw color shade in the samples of 9.2 micrometers diameter epoxy particle, and stated that there was observed no color shade in the other samples. Also, there were formed branching defects in 14 out of 20 samples containing 2.3 micrometers diameter epoxy particles. Accordingly, it is concluded in this case that acceptable devices can be formed when the diameter of the epoxy particles is chosen to be from 2.9 micrometers to 8.2 micrometers. The ratio of the distance before the disposing to that after the disposing were from 0.77 to 0.87 in this acceptable samples.

EXAMPLE 2

SiO$_2$ particles were used as non-fusable spacers. The diameter of the non-fusable particles was 2 micrometers. Epoxy particles were used as fusable spacers. The distribution density of the epoxy particles was changed. Tables 3 and 4 show the average distances between the substrates of each 20 samples before and after the disposing of the liquid crystal material respectively. The top row of each table shows the diameters of the epoxy particles. The bottom row (Z row) shows the chromatic differences. A–K on the leftest column indicate the measuring points shown in FIG. 3.

TABLE 3

| | (before the disposing) | | | | | | |
|---|---|---|---|---|---|---|---|
| | 1 | 2 | 20 | 45 | 130 | 200 | 210 |
| A | 1.7 | 1.7 | 1.6 | 1.6 | 1.6 | 1.7 | 1.6 |
| B | 1.7 | 1.7 | 1.7 | 1.7 | 1.6 | 1.6 | 1.6 |
| C | 1.6 | 1.6 | 1.6 | 1.7 | 1.7 | 1.7 | 1.6 |
| D | 1.6 | 1.7 | 1.7 | 1.6 | 1.6 | 1.6 | 1.7 |
| E | 1.7 | 1.6 | 1.6 | 1.7 | 1.6 | 1.6 | 1.6 |
| F | 1.6 | 1.6 | 1.6 | 1.6 | 1.7 | 1.7 | 1.6 |
| G | 1.7 | 1.6 | 1.6 | 1.6 | 1.7 | 1.7 | 1.7 |
| H | 1.7 | 1.6 | 1.6 | 1.7 | 1.6 | 1.6 | 1.6 |
| I | 1.6 | 1.6 | 1.6 | 1.6 | 1.6 | 1.6 | 1.6 |
| J | 1.6 | 1.6 | 1.7 | 1.7 | 1.6 | 1.7 | 1.7 |
| K | 1.6 | 1.7 | 1.6 | 1.7 | 1.6 | 1.6 | 1.7 |
| L | 1.7 | 1.6 | 1.6 | 1.7 | 1.6 | 1.6 | 1.6 |

TABLE 4

| | \multicolumn{7}{c}{(after the disposing)} | | | | | | |
|---|---|---|---|---|---|---|---|
| | 1 | 2 | 20 | 45 | 130 | 200 | 210 |
| A | 2.9 | 2.0 | 2.0 | 2.1 | 2.0 | 2.1 | 2.3 |
| B | 3.0 | 2.1 | 2.1 | 2.0 | 2.1 | 2.0 | 2.2 |
| C | 2.7 | 2.1 | 2.1 | 2.0 | 2.0 | 2.1 | 2.3 |
| D | 2.8 | 2.1 | 2.0 | 2.0 | 2.1 | 2.0 | 2.4 |
| E | 2.6 | 2.0 | 2.1 | 2.0 | 2.1 | 2.1 | 2.2 |
| F | 2.8 | 2.0 | 2.1 | 2.0 | 2.1 | 2.1 | 2.4 |
| G | 2.7 | 2.1 | 2.1 | 2.1 | 2.1 | 2.1 | 2.4 |
| H | 3.1 | 2.1 | 2.0 | 2.0 | 2.1 | 2.0 | 2.3 |
| I | 2.8 | 2.0 | 2.0 | 2.0 | 2.0 | 2.0 | 2.3 |
| J | 2.8 | 2.0 | 2.1 | 2.0 | 2.1 | 2.1 | 2.4 |
| K | 2.9 | 2.1 | 2.0 | 2.1 | 2.0 | 2.1 | 2.2 |
| L | 2.8 | 2.0 | 2.1 | 2.0 | 2.1 | 2.1 | 2.3 |
| Z | 8.5 | 3.3 | 4.1 | 4.1 | 4.2 | 4.6 | 5.6 |

As can be seen from the above two comparison tables, when the density of the epoxy particles were from 2 particles /mm$^2$ to 200 particles/mm$^2$, the chromatic differences did not exceed 5 and therefore no color shade was appreciable to the naked eyes. Actually, out of ten persons, while four saw color shade in the samples of 210 /mm$^2$ all stated that there was observed no color shade in the other samples. There might be coming-off of the spacers in the case of 1 /mm$^2$. Also, there were formed branching defects in 14 out of 20 samples containing 2.3 micrometers diameter epoxy particles. Accordingly, it is concluded in this case that acceptable devices can be formed when the distribution density of the epoxy particles is chosen to be from 2 particles /mm$^2$ to 200 particles/mm$^2$. The ratio of the distance before the disposing to that after the disposing were from 0.77 to 0.87 in this acceptable samples.

EXAMPLE 3

Polystylene particles were used as non-fusable spacers. The diameter of the non-fusable particles was 2 micrometers. Two types of epoxy particles were used as fusable spacers, one having little resilience while the other having a large resilience. The diameter of one type particles was 5.5 micrometers and the diameter of the other type particle was changed to have various values. Tables 5 and 6 show the average distances between the substrates of each 20 samples before and after the disposing of the liquid crystal material respectively. The top row of each table shows the diameters of the other type epoxy particles having the large diameter. The bottom row (Z row) shows the chromatic differences. A–K on the leftest column indicate the measuring points shown in FIG. 3.

TABLE 5

| | \multicolumn{7}{c}{(before the disposing)} | | | | | | |
|---|---|---|---|---|---|---|---|
| | 7.5 | 8.5 | 9.5 | 10.5 | 11.5 | 12.5 | 13.5 |
| A | 1.6 | 1.7 | 1.7 | 1.7 | 1.6 | 1.6 | 1.6 |
| B | 1.6 | 1.6 | 1.6 | 1.7 | 1.7 | 1.7 | 1.7 |
| C | 1.7 | 1.6 | 1.6 | 1.7 | 1.7 | 1.7 | 1.7 |
| D | 1.6 | 1.7 | 1.7 | 1.7 | 1.6 | 1.6 | 1.7 |
| E | 1.6 | 1.7 | 1.6 | 1.6 | 1.6 | 1.6 | 1.7 |
| F | 1.7 | 1.6 | 1.7 | 1.6 | 1.7 | 1.7 | 1.6 |
| G | 1.7 | 1.6 | 1.6 | 1.7 | 1.6 | 1.7 | 1.6 |
| H | 1.7 | 1.6 | 1.6 | 1.7 | 1.7 | 1.6 | 1.6 |
| I | 1.6 | 1.6 | 1.7 | 1.6 | 1.7 | 1.6 | 1.6 |
| J | 1.6 | 1.7 | 1.6 | 1.6 | 1.7 | 1.7 | 1.7 |
| K | 1.6 | 1.7 | 1.6 | 1.7 | 1.6 | 1.6 | 1.6 |
| L | 1.7 | 1.6 | 1.7 | 1.6 | 1.6 | 1.7 | 1.6 |

TABLE 6

| | \multicolumn{7}{c}{(after the disposing)} | | | | | | |
|---|---|---|---|---|---|---|---|
| | 7.5 | 8.5 | 9.5 | 10.5 | 11.5 | 12.5 | 13.5 |
| A | 1.9 | 2.0 | 2.1 | 2.1 | 2.3 | 2.3 | 2.3 |
| B | 2.0 | 1.9 | 2.2 | 2.2 | 2.2 | 2.3 | 2.4 |
| C | 1.9 | 2.1 | 2.2 | 2.3 | 2.2 | 2.3 | 2.5 |
| D | 2.0 | 2.0 | 2.1 | 2.3 | 2.2 | 2.2 | 2.5 |
| E | 2.1 | 1.9 | 2.2 | 2.3 | 2.3 | 2.3 | 2.2 |
| F | 1.9 | 2.1 | 2.3 | 2.2 | 2.1 | 2.3 | 2.6 |
| G | 1.9 | 1.9 | 2.3 | 2.3 | 2.3 | 2.3 | 2.6 |
| H | 2.0 | 1.9 | 2.2 | 2.3 | 2.3 | 2.3 | 2.5 |
| I | 2.0 | 1.9 | 2.1 | 2.3 | 2.2 | 2.3 | 2.5 |
| J | 2.0 | 2.0 | 2.2 | 2.2 | 2.3 | 2.2 | 2.3 |
| K | 1.9 | 2.1 | 2.1 | 2.2 | 2.2 | 2.3 | 2.5 |
| L | 1.9 | 2.1 | 2.2 | 2.2 | 2.3 | 2.3 | 2.6 |
| Z | 2.9 | 3.1 | 3.6 | 4.2 | 4.2 | 4.8 | 6.1 |

As can be seen from the above two comparison tables, when the diameter of the other type epoxy particles does not exceed 12.5 micrometers, the chromatic differences did not exceed 5 and therefore no color shade was appreciable to the naked eyes. Actually, out of ten persons, while six saw color shade in the samples of 13.5 micrometers diameter epoxy particle, all stated that there was observed no color shade in the other samples. Also, there were formed branching defects in 15 out of 20 samples containing 7.5 micrometers diameter epoxy particles and 12 out of 20 samples containing 8.5 micrometers diameter epoxy particle.

EXAMPLE 4

Polystyrene particles were used as non-fusable spacers. The diameter of the non-fusable particles was 3 micrometers. Two types of epoxy particles were used as fusable spacers, one having little resilience while the other having a large resilience. The diameter of one type particles was 7.5 micrometers and the diameter of the other type particle was changed to have various values. Tables 7 and 8 show the average distances between the substrates of each 20 samples before and after the disposing of the liquid crystal material respectively. The top row of each table shows the diameters of the other type epoxy particles having the large diameter. The bottom row (Z row) shows the chromatic differences. A–K on the leftest column indicate the measuring points shown in FIG. 3.

TABLE 7

| | \multicolumn{7}{c}{(before the disposing)} | | | | | | |
|---|---|---|---|---|---|---|---|
| | 10.5 | 11.5 | 12.5 | 13.5 | 14.5 | 15.5 | 16.5 |
| A | 2.4 | 2.5 | 2.4 | 2.5 | 2.5 | 2.5 | 2.6 |
| B | 2.5 | 2.5 | 2.5 | 2.6 | 2.5 | 2.6 | 2.6 |
| C | 2.6 | 2.6 | 2.5 | 2.5 | 2.5 | 2.6 | 2.6 |
| D | 2.6 | 2.5 | 2.5 | 2.6 | 2.5 | 2.5 | 2.6 |
| E | 2.5 | 2.5 | 2.5 | 2.4 | 2.6 | 2.6 | 2.6 |
| F | 2.4 | 2.4 | 2.6 | 2.5 | 2.5 | 2.5 | 2.6 |
| G | 2.5 | 2.4 | 2.5 | 2.5 | 2.5 | 2.6 | 2.6 |
| H | 2.6 | 2.4 | 2.6 | 2.6 | 2.5 | 2.6 | 2.5 |
| I | 2.5 | 2.5 | 2.4 | 2.5 | 2.6 | 2.6 | 2.6 |
| J | 2.5 | 2.5 | 2.5 | 2.5 | 2.5 | 2.5 | 2.6 |
| K | 2.6 | 2.4 | 2.5 | 2.5 | 2.5 | 2.6 | 2.5 |
| L | 2.6 | 2.6 | 2.6 | 2.5 | 2.5 | 2.6 | 2.6 |

TABLE 8

| | \multicolumn{7}{c}{(after the disposing)} | | | | | | |
|---|---|---|---|---|---|---|---|
| | 10.5 | 11.5 | 12.5 | 13.5 | 14.5 | 15.5 | 16.5 |
| A | 2.9 | 3.0 | 3.0 | 3.1 | 3.1 | 3.0 | 3.1 |
| B | 2.8 | 3.0 | 3.1 | 3.1 | 3.1 | 3.1 | 3.2 |
| C | 2.8 | 3.0 | 3.0 | 3.0 | 3.1 | 3.1 | 3.3 |
| D | 2.8 | 3.1 | 3.0 | 3.0 | 3.1 | 3.1 | 3.2 |
| E | 2.9 | 3.0 | 3.1 | 3.0 | 3.0 | 3.2 | 3.2 |

TABLE 8-continued

| | (after the disposing) | | | | | | |
|---|---|---|---|---|---|---|---|
| | 10.5 | 11.5 | 12.5 | 13.5 | 14.5 | 15.5 | 16.5 |
| F | 3.0 | 3.0 | 3.1 | 3.0 | 3.0 | 3.2 | 3.1 |
| G | 2.8 | 3.0 | 3.0 | 3.0 | 3.1 | 3.1 | 3.3 |
| H | 2.9 | 3.0 | 3.0 | 3.0 | 3.0 | 3.0 | 3.3 |
| I | 2.9 | 3.0 | 3.0 | 3.1 | 3.1 | 3.1 | 3.2 |
| J | 2.8 | 3.0 | 3.0 | 3.1 | 3.1 | 3.2 | 3.2 |
| K | 2.9 | 3.0 | 3.0 | 3.1 | 3.0 | 3.1 | 3.2 |
| L | 3.0 | 3.0 | 3.1 | 3.0 | 3.1 | 3.1 | 3.2 |
| Z | 3.2 | 3.5 | 3.6 | 4.2 | 4.2 | 5.2 | 6.3 |

As can be seen from the above two comparison tables, when the diameter of the other type epoxy particles does not exceed 14.5 micrometers, the chromatic differences did not exceed 5 and therefore no color shade was appreciable to the naked eyes. Actually, out of ten persons, while three saw color shade in the samples of 15.5 micrometers diameter epoxy particle and eight saw color shade in the samples of 16.5 micrometers, all stated that there was observed no color shade in the other samples. Also, there were formed branching defects in 12 out of 20 samples containing 10.5 micrometers diameter epoxy particles and 12 out of 20 samples containing 8.5 micrometers diameter epoxy particle. Accordingly and from the results of other similar experiments conducted, it is concluded in this case that acceptable devices without branching defects can be formed when the diameter of the larger epoxy spacer is larger than that of the smaller spacer by 4–7 micrometers.

EXAMPLE 5

$SO_2$ particles were used as non-fusable spacers. The diameter of the non-fusable particles was 2 micrometers. Two types of epoxy particles were used as fusable spacers, one having little resilience while the other having a large resilience. The distribution density of the other type particles having the large resilience was 1.5 $/mm^2$ and that of the particle having little resilience was changed to have various values. Tables 9 and 10 show the average distances between the substrates of each 20 samples before and after the disposing of the liquid crystal material respectively. The top row of each table shows the distribution of the epoxy particles having little diameter. The bottom row (Z row) shows the chromatic differences. A-K on the leftest column indicate the measuring points shown in FIG. 3.

TABLE 9

| | (before the disposing) | | | | | | |
|---|---|---|---|---|---|---|---|
| | 2.3 | 3.0 | 9.2 | 16.8 | 19.2 | 24.1 | 27.2 |
| A | 1.6 | 1.7 | 1.6 | 1.6 | 1.6 | 1.7 | 1.6 |
| B | 1.6 | 1.6 | 1.7 | 1.7 | 1.7 | 1.7 | 1.7 |
| C | 1.7 | 1.6 | 1.6 | 1.6 | 1.6 | 1.6 | 1.6 |
| D | 1.6 | 1.6 | 1.7 | 1.7 | 1.7 | 1.7 | 1.7 |
| E | 1.6 | 1.7 | 1.7 | 1.6 | 1.6 | 1.6 | 1.6 |
| F | 1.6 | 1.6 | 1.6 | 1.7 | 1.6 | 1.7 | 1.7 |
| G | 1.6 | 1.7 | 1.6 | 1.6 | 1.7 | 1.6 | 1.6 |
| H | 1.7 | 1.7 | 1.6 | 1.7 | 1.6 | 1.7 | 1.6 |
| I | 1.7 | 1.6 | 1.7 | 1.7 | 1.7 | 1.6 | 1.6 |
| J | 1.7 | 1.6 | 1.7 | 1.6 | 1.6 | 1.6 | 1.7 |
| K | 1.6 | 1.7 | 1.6 | 1.6 | 1.6 | 1.6 | 1.7 |
| L | 1.6 | 1.6 | 1.6 | 1.6 | 1.7 | 1.7 | 1.6 |

TABLE 10

| | (after the disposing) | | | | | | |
|---|---|---|---|---|---|---|---|
| | 2.3 | 3.0 | 9.2 | 16.8 | 19.2 | 24.1 | 27.2 |
| A | 2.4 | 2.1 | 2.1 | 2.1 | 2.0 | 2.0 | 1.9 |

TABLE 10-continued

| | (after the disposing) | | | | | | |
|---|---|---|---|---|---|---|---|
| | 2.3 | 3.0 | 9.2 | 16.8 | 19.2 | 24.1 | 27.2 |
| B | 2.5 | 2.1 | 2.0 | 2.0 | 2.0 | 2.0 | 1.9 |
| C | 2.6 | 2.1 | 2.0 | 2.0 | 2.0 | 2.0 | 2.0 |
| D | 2.4 | 2.0 | 2.1 | 2.0 | 2.0 | 2.0 | 2.1 |
| E | 2.7 | 2.1 | 2.0 | 2.0 | 2.0 | 2.0 | 2.0 |
| F | 2.6 | 2.0 | 2.0 | 2.1 | 2.1 | 2.0 | 1.9 |
| G | 2.8 | 2.0 | 2.0 | 2.0 | 2.0 | 2.0 | 1.9 |
| H | 2.7 | 2.1 | 2.0 | 2.1 | 2.0 | 2.0 | 1.9 |
| I | 2.7 | 2.1 | 2.1 | 2.0 | 2.0 | 2.1 | 2.0 |
| J | 2.6 | 2.1 | 2.0 | 2.0 | 2.1 | 2.0 | 1.9 |
| K | 2.6 | 2.0 | 2.1 | 2.0 | 2.0 | 2.0 | 1.9 |
| L | 2.7 | 2.1 | 2.0 | 2.0 | 2.0 | 2.0 | 1.9 |
| Z | 9.2 | 4.7 | 4.1 | 3.9 | 3.8 | 3.1 | 3.2 |

As can be seen from the above two comprise tables, when the distribution density of the epoxy particles having little resilience was not smaller than 3 $/mm^2$, the chromatic differences did not exceed 5 and therefore no color shade was appreciable to the naked eyes. Actually, out of ten persons, while all saw color shade i the samples of 2.3 $/mm^2$, all stated that there was observed no color shade in the other samples. Also, there were formed branching defects in 16 out of 20 samples of 23.2 $/mm^2$. From the above results and in accordance with other experiments conducted, it is concluded in this case that acceptable devices can be formed when the distribution of the epoxy particles having little resilience is larger than that of the other type of epoxy particles by a factor of 2-16. The ratio of the distance before the disposing to that after the disposing were from 0.77 to 0.87 in this acceptable samples.

EXAMPLE 6

Two types of $SiO_2$ particles were used as non-fusable spacers. The diameter of one type of $SiO_2$ particles was 2.5 micrometers. The diameter of the other type of $SiO_2$ particles was changed. Epoxy particles were not used. Tables 11 and 12 show the average distances between the substrates of each 20 samples before and after the disposing of the liquid crystal material respectively. The top row of each table shows the diameters of the other epoxy particles. The bottom row (Z row) shows the chromatic differences. A-K on the leftest column indicate the measuring points shown in FIG. 3.

TABLE 11

| | (before the disposing) | | | | | | |
|---|---|---|---|---|---|---|---|
| | 1.7 | 1.8 | 1.9 | 2.0 | 2.1 | 2.2 | 2.3 |
| A | 1.8 | 1.7 | 2.0 | 2.0 | 2.0 | 2.2 | 2.4 |
| B | 1.8 | 1.8 | 2.0 | 2.1 | 2.1 | 2.1 | 2.3 |
| C | 1.6 | 1.8 | 2.0 | 2.1 | 2.1 | 2.2 | 2.3 |
| D | 1.6 | 1.8 | 2.1 | 2.0 | 2.1 | 2.3 | 2.3 |
| E | 1.7 | 1.8 | 2.0 | 2.0 | 2.1 | 2.2 | 2.3 |
| F | 1.7 | 1.9 | 2.0 | 2.0 | 2.1 | 2.2 | 2.2 |
| G | 1.7 | 1.8 | 2.0 | 2.1 | 2.1 | 2.2 | 2.3 |
| H | 1.6 | 1.7 | 2.0 | 2.0 | 2.1 | 2.2 | 2.2 |
| I | 1.8 | 1.8 | 2.0 | 2.1 | 2.0 | 2.1 | 2.2 |
| J | 1.6 | 1.8 | 2.0 | 2.1 | 2.1 | 2.3 | 2.3 |
| K | 1.7 | 1.7 | 2.0 | 2.0 | 2.1 | 2.2 | 2.4 |
| L | 1.7 | 1.8 | 2.0 | 2.1 | 2.1 | 2.2 | 2.2 |

TABLE 12

| | (after the disposing) | | | | | | |
|---|---|---|---|---|---|---|---|
| | 1.7 | 1.8 | 1.9 | 2.0 | 2.1 | 2.2 | 2.3 |
| A | 2.3 | 2.4 | 2.5 | 2.6 | 2.6 | 2.7 | 2.6 |
| B | 2.4 | 2.3 | 2.5 | 2.6 | 2.5 | 2.7 | 2.6 |
| C | 2.4 | 2.4 | 2.5 | 2.5 | 2.6 | 2.7 | 2.7 |
| D | 2.5 | 2.5 | 2.6 | 2.6 | 2.6 | 2.6 | 2.8 |

TABLE 12-continued

| | (after the disposing) | | | | | | |
|---|---|---|---|---|---|---|---|
| | 1.7 | 1.8 | 1.9 | 2.0 | 2.1 | 2.2 | 2.3 |
| E | 2.3 | 2.5 | 2.5 | 2.6 | 2.6 | 2.5 | 2.6 |
| F | 2.3 | 2.4 | 2.5 | 2.5 | 2.6 | 2.7 | 2.7 |
| G | 2.3 | 2.3 | 2.5 | 2.5 | 2.6 | 2.6 | 2.6 |
| H | 2.3 | 2.5 | 2.5 | 2.6 | 2.5 | 2.5 | 2.8 |
| I | 2.5 | 2.3 | 2.6 | 2.6 | 2.5 | 2.7 | 2.8 |
| J | 2.3 | 2.5 | 2.6 | 2.5 | 2.6 | 2.7 | 2.7 |
| K | 2.3 | 2.4 | 2.6 | 2.6 | 2.6 | 2.7 | 2.6 |
| L | 2.4 | 2.5 | 2.6 | 2.5 | 2.6 | 2.7 | 2.8 |
| Z | 5.3 | 5.1 | 3.6 | 4.2 | 4.2 | 5.2 | 5.9 |

As can be seen from the above two comparison tables, when the other type $SiO_2$ particles of from 1.9 micrometers to 2.1 micrometers were used, the chromatic differences did not exceed 5 and therefore no color shade was appreciable to the naked eyes. Actually, out of ten persons, while four, two, two and one persons saw color shade respectively in the samples of 2.3, 2.2, 1.7 and 1.8 micrometers, all stated that there was observed no color shade in the other samples. Accordingly, it is concluded in this case that acceptable devices can be formed when the diameter of the smaller $SiO_2$ spacer is 0.70–0.85 of that of the smaller $SiO_2$ spacer. The ratio of the distance before the disposing to that after the disposing were from 0.77 to 0.87 in this acceptable samples.

While several embodiments have been specifically described, it is to be appreciated that the present invention is not limited to the particular examples described and that modifications and variations can be made without departure from the scope of the invention as defined by the appended claims.

We claim:

1. A liquid crystal device comprising:
   a pair of substrates;
   an electrode arrangement formed on the inside surfaces of the pair of substrates;
   a ferroelectric liquid crystal layer disposed between said substrates;
   a plurality of spacers distributed between said substrates in order to more uniformly maintain the distance between said substrates, said spacers comprising non-fusible spacers and fusible resilient spacers;
   wherein the distribution density of said fusible resilient spacers is selected from 2 to 200 particles per square millimeter such that the distance between the mated substrates before the liquid crystal is disposed is 0.77–0.87 of that after the liquid crystal is disposed.

2. The liquid crystal device of claim 1 wherein said non-fusible spacers are made of polystyrene.

3. The liquid crystal device of claim 1 wherein said non-fusible spacers are made of $SiO_2$.

4. The liquid crystal device of claim 1 wherein said fusible resilient spacers are made of an epoxy resin.

5. The liquid crystal device of claim 4 wherein a diameter of aid epoxy spacers is 2.9–8.2 $\mu$m.

* * * * *